United States Patent
Ojima et al.

(10) Patent No.: US 6,902,380 B2
(45) Date of Patent: Jun. 7, 2005

(54) VACUUM PUMP WITH PUMP ROTOR PAIRS AND PERMANENT MAGNET MOTOR

(75) Inventors: Yoshinori Ojima, Kamakura (JP); Kozo Matake, Kawasaki (JP); Takanori Inada, Fujisawa (JP); Kiyoshi Yanagisawa, Machida (JP)

(73) Assignee: Ebara Corporation, Tokyo (JP)

( * ) Notice: Subject to any disclaimer, the term of this patent is extended or adjusted under 35 U.S.C. 154(b) by 161 days.

(21) Appl. No.: 10/159,287

(22) Filed: Jun. 3, 2002

(65) Prior Publication Data

US 2002/0197171 A1 Dec. 26, 2002

(30) Foreign Application Priority Data

Jun. 6, 2001 (JP) ........................................ 2001-171562

(51) Int. Cl.[7] ............................. H02K 1/00; F04B 17/03
(52) U.S. Cl. .................................... 417/410.4; 310/216
(58) Field of Search .......................... 417/410.1, 410.4, 417/321, 410.3; 310/216, 177, 36

(56) References Cited

U.S. PATENT DOCUMENTS

| | | | |
|---|---|---|---|
| 4,353,002 A | * 10/1982 | Kobayashi et al. | ........... 310/64 |
| 5,096,390 A | 3/1992 | Sevrain et al. | |
| 5,261,802 A | * 11/1993 | Yanagisawa | ............. 418/201.2 |
| 5,378,128 A | * 1/1995 | Yanagisawa | .................... 418/9 |
| 5,542,825 A | * 8/1996 | Perrillat-Amede | ....... 417/423.4 |
| 5,779,453 A | * 7/1998 | Nagayama et al. | ...... 417/410.4 |
| 5,782,609 A | * 7/1998 | Ikemoto et al. | ............ 417/44.1 |
| 5,846,062 A | * 12/1998 | Yanagisawa et al. | .... 417/410.4 |
| 6,039,827 A | * 3/2000 | Cramer | ....................... 156/173 |
| 6,092,994 A | * 7/2000 | Yamamoto et al. | ........... 417/53 |
| 6,183,218 B1 | * 2/2001 | Ojima et al. | ............. 417/410.4 |
| 6,448,682 B2 | * 9/2002 | Sakagami et al. | .......... 310/216 |
| 6,528,920 B2 | * 3/2003 | Matsunobu et al. | ... 310/156.57 |
| 2001/0000722 A1 | 5/2001 | Ojima et al. | |
| 2002/0067096 A1 | * 6/2002 | Yamamoto et al. | ......... 310/216 |

FOREIGN PATENT DOCUMENTS

JP 8-319967 12/1996

* cited by examiner

Primary Examiner—Charles G. Freay
(74) Attorney, Agent, or Firm—Westerman, Hattori, Daniels & Adrian, LLP

(57) ABSTRACT

A vacuum pump has a casing having an inlet port and an outlet port, and a pair of confronting pump rotors which are provided inside the casing and synchronously rotatable for drawing in a gas from the inlet port and discharging the gas from the outlet port. A motor for rotating the confronting pump rotors is a permanent magnet motor having a stator and a motor rotor. The motor rotor has an iron core and permanent magnets disposed within the iron core.

7 Claims, 6 Drawing Sheets

VACUUM PUMP WITH PUMP ROTOR PAIRS AND PERMANENT MAGNET MOTOR

BACKGROUND OF THE INVENTION

1. Field of the Invention

The present invention relates to a vacuum pump, and more particularly to a vacuum pump which is preferably used for evacuating a gas from a vacuum chamber used in a semiconductor fabrication process.

2. Description of the Related Art

There has heretofore been known a vacuum pump called a positive-displacement pump having a pair of pump rotors which rotate synchronously with each other for drawing in and discharging a gas. The positive-displacement vacuum pumps include Roots vacuum pumps, screw vacuum pumps, and the like, and are widely used for evacuating a process gas from a vacuum chamber used in a semiconductor fabrication process.

FIG. 1 of the accompanying drawings is a cross-sectional view showing a conventional Roots-type positive-displacement vacuum pump which comprises a multistage Roots vacuum pump having a pair of pump rotors housed in a casing. Each of the pump rotors has three-stage Roots rotors. As shown in FIG. 1, a pump rotor 51 comprises rotors 51a, 51b and 51c disposed in a casing 52, and a main shaft 51d rotatably supported by bearings 53. The vacuum pump has an inlet port 54 formed in the casing 52 and disposed above the rotor 51a which has the largest axial width, and has an outlet port 55 formed in the casing 52 and disposed below the rotor 51c which has the smallest axial width. The pump rotor 51 is coupled to a motor M at the end of a main shaft 51d located at the outlet port side. A timing gear 56 is fixed to the pump rotor 51 at the other end of the main shafts 51d located at the inlet port side. The timing gears 56 serves to link a pair of confronting pump rotors 51, one of which is shown in FIG. 1.

When the motor M is energized, any pair of pump rotors 51 are synchronously rotated in opposite directions by the timing gears 56, and a gas is delivered and evacuated by the multistage rotors 51a, 51b and 51c. When the multistage vacuum pump is in operation, the rotor 51a positioned near the inlet port 54 is not heated to a high temperature, but the rotor 51c positioned near the outlet port 55 is heated to a high temperature by the gas which has been compressed by rotors 51a, 51b and 51c in a multistage manner.

A motor used for driving a vacuum pump generally comprises an induction motor. The motor M comprises a motor rotor 57 having an iron core 58 which consists of a laminated assembly of electromagnetic steel sheets. The iron core 12 has slots accommodating rotor bars (not shown) as secondary conductors. When the motor M is in operation, induced current flows through the secondary conductors due to a rotating field produced by a stator 60 of the motor M. Thus, the rotating field and the induced current generate a torque for rotating the motor rotor 57. However, the induced current flowing through the secondary conductors heats the motor rotor 57, thereby making the motor M itself high in temperature.

In the case where the motor is disposed at the outlet port side heated by the compressed gas and with the motor M itself generating heat, the motor M tends to be excessively heated to a high temperature and hence greatly reduced in efficiency. Therefore, in the case where the motor is disposed at the outlet port side, the motor M needs to be connected to the main shaft 51d through a coupling or the like so that the motor M is spaced by a certain distance from the outlet port 55. The motor M having such a structure causes the vacuum pump to be more susceptible to a mechanical loss, and also fails to make the vacuum pump compact.

Another conventional vacuum pump has a motor which is disposed at an inlet port side having a relatively low temperature and has a motor rotor which comprises permanent magnets directly fixed to a pump rotor and generates no induced current. However, if the vacuum pump draws in a corrosive gas used in the semiconductor fabrication process, the permanent magnets of the motor are corroded by the gas. Consequently, the permanent magnets reduce their magnetic forces and are damaged, possibly resulting in a motor failure. If some of permanent magnets are damaged while the motor is being assembled, then the permanent magnets tend break and scatter while the motor is in rotation, thus causing the vacuum pump to stop. Furthermore, when the motor rotor is suddenly heated to a high temperature, the mechanical strength of the permanent magnets is lowered and/or the bonding strength of an adhesive by which the permanent magnets are held in place is reduced. Consequently, the permanent magnets detach from the motor rotor during rotation, resulting in a breakdown of the motor.

In the vacuum pump where the motor is located at the inlet port side, it is necessary to dispose a bearing for supporting the motor at the inlet port side. In the case where the bearing is disposed at the inlet port side, oil molecules from grease used to lubricate the bearing are likely to diffuse into a region located upstream of the inlet port where a vacuum is developed. Therefore, a shaft seal mechanism is required to be installed to prevent the oil molecules from diffusing into the vacuum chamber. The shaft seal mechanism makes it difficult to simplify the structure of the vacuum pump, and also makes it difficult to make the vacuum pump compact. These problems occur also in other positive-displacement vacuum pumps such as a screw vacuum pump.

SUMMARY OF THE INVENTION

The present invention has been made in view of the foregoing circumstances. It is therefore an object of the present invention to provide a vacuum pump which is capable of highly reliable operation using a motor having a motor rotor whose heat generation is minimized and having capability of operating safely under high-temperature conditions.

In order to achieve the above object, according to one aspect of the present invention, there is provided a vacuum pump comprising a casing having an inlet port and an outlet port, a pair of confronting pump rotors provided in the casing and being synchronously rotatable for drawing in a gas from the inlet port and discharging the gas from the outlet port, and a motor for rotating the confronting pump rotors, the motor comprising a permanent magnet motor having a stator and a motor rotor, the motor rotor having an iron core and a permanent magnet disposed within the iron core.

With the permanent magnet surrounded by an iron core, the permanent magnet can keep its mechanical strength even when the vacuum pump is operated at a high temperature. Even if the bonding strength of an adhesive by which the permanent magnet is secured in position is lowered by a high temperature, the permanent magnet is prevented from being detached.

When a corrosive gas is drawn into the vacuum pump and enters the motor, since the permanent magnet is embedded in the iron core, the surface area of the permanent magnet which contacts the corrosive gas is small. Therefore, the permanent magnet is prevented from being substantially corroded, and hence can maintain its desired performance.

A plurality of permanent magnets including the permanent magnet are disposed within the iron core around a shaft of the motor rotor such that respective magnetic pole faces of the permanent magnet lie perpendicular to the radial direction of the motor rotor, and the iron core comprises a laminated assembly of electromagnetic steel sheets which are welded on an outer circumferential surface of the iron core at positions located in the radial directions from the centers of magnetic pole faces of the permanent magnets.

Since magnetic fluxes passing through the welded portions are small, any eddy current generated in the iron core due to a change in the magnetic fluxes produced by the stator while the motor is in operation can be reduced to a minimum. Therefore, any heat generation in the iron core is minimized, and the efficiency of the motor remains high by the reduction of eddy current losses.

The electromagnetic steel sheets have respective recesses defined in outer circumferential edges at the positions located in the radial directions from magnetic pole centers of the permanent magnets.

The recess provides a welding groove defined in the outer circumferential surface of the iron core. The electromagnetic steel sheets are welded and joined together by a welded portion in the welding groove. Since a magnetic gap between the welded portion and the stator is greater than the magnetic gap between the outer circumferential surface of the motor rotor and the stator, any magnetic fluxes passing through the welded portion are very small. As a result, any eddy current generated in the iron core is reduced, and hence any heat generation of the iron core and any eddy current loss thereof can be minimized.

The motor rotor has an outer circumferential surface covered with a protective layer.

The protective layer prevents the permanent magnet and the electromagnetic steel sheets from contacting humidity in the atmosphere and a corrosive gas, thus preventing them from suffering rust and corrosion.

The permanent magnet motor is disposed at the side of the outlet port, i.e. the outlet port side.

The pump rotors comprise respective main shafts rotatably supported by bearings, the bearings for supporting each of the main shafts are positioned at a predetermined position in a region at an end of the main shaft at the side of the outlet port to a rotor of the pump rotor such that the rotor is supported in a cantilevered fashion by the bearings.

Since the pump rotors are supported in a cantilevered fashion, it is not necessary to dispose a bearing at the side of the inlet port (inlet port side). Thus, an oil mist from grease used to lubricate such a bearing does not diffuse into a region upstream of the inlet port. Thus, it is not required to use a shaft seal mechanism in the vacuum pump for preventing the oil mist from diffusion.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A positive-displacement screw vacuum pump according to a first embodiment of the present invention will be described below with reference to FIGS. 2 to 4A through 4D.

Figure 1:
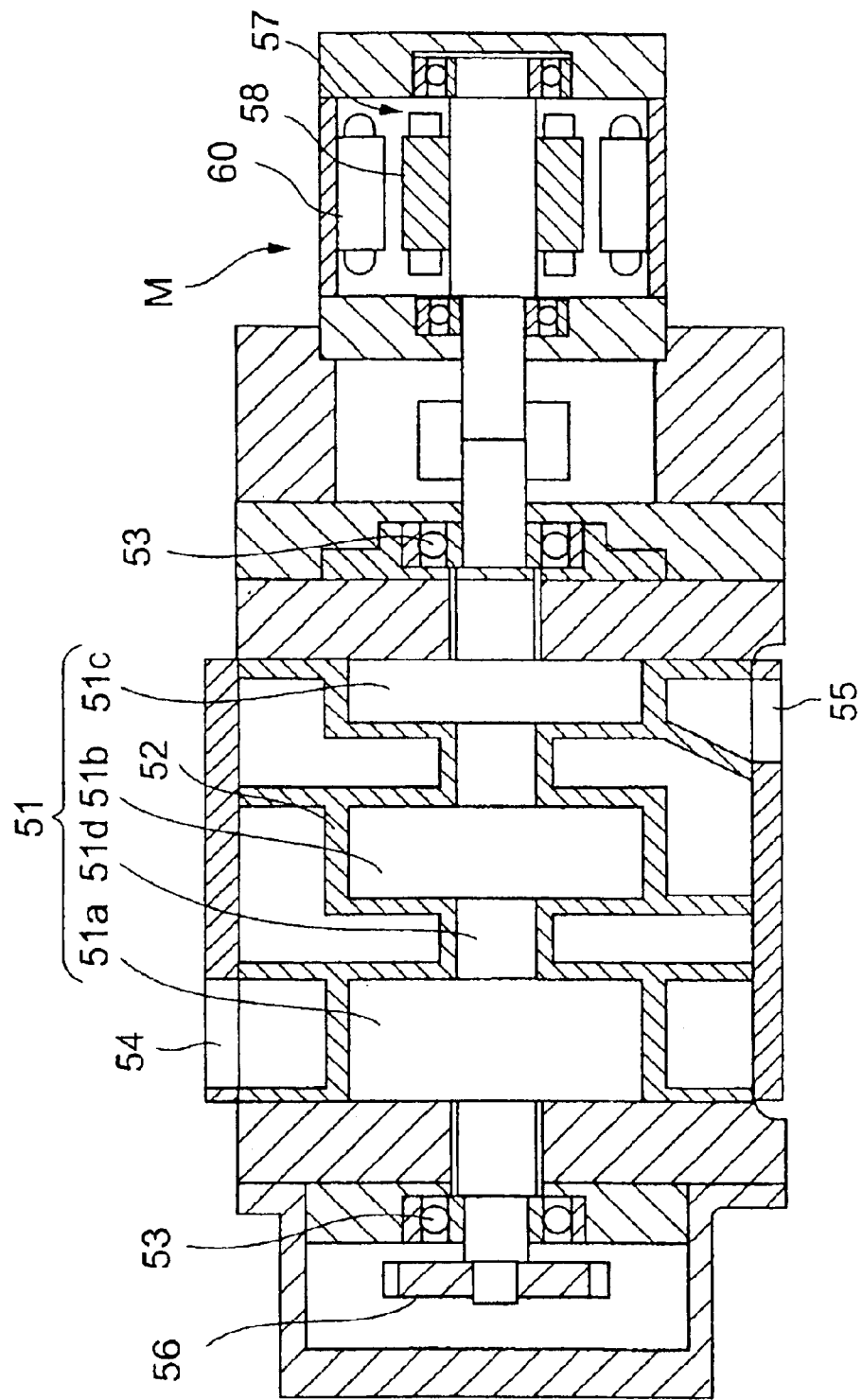
FIG. 1 is a cross-sectional view of a conventional Roots-type positive-displacement multistage vacuum pump.
Figure 2:
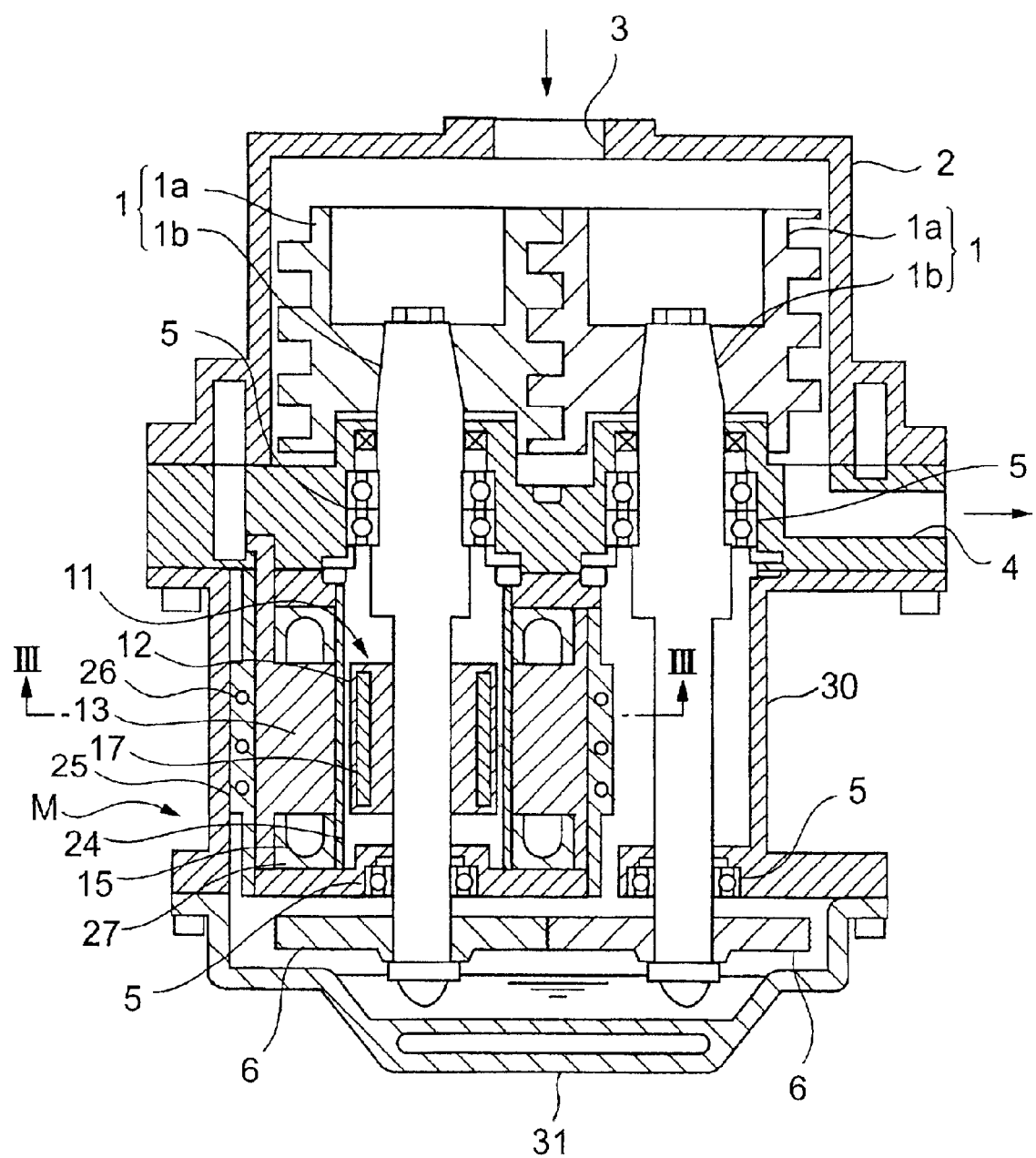
FIG. 2 is a cross-sectional view of a positive-displacement screw vacuum pump according to a first embodiment of the present invention.

As shown in FIG. 2, the positive-displacement screw vacuum pump has a pair of pump rotors 1 each comprising a rotor 1a and a main shaft 1b supporting the rotor 1a. A pair of confronting rotors 1a are disposed in a casing 2. The positive-displacement screw vacuum pump is vertically installed such that an axis of the pump rotor extends vertically, timing gears are placed at a lower part, and an inlet port is placed at an upper part. The casing 2 has an inlet port 3 defined in an upper wall thereof and an outlet port 4 defined in a lower wall thereof. The pair of the pump rotors 1 are rotatably supported by bearings 5 to allow the rotors 1a to rotate within the casing 2 with a slight clearance kept between the confronting rotors 1a and between each of the rotors 1a and the casing 2. The bearings 5 are not disposed at the side of the inlet port 3, i.e. the inlet port side, but are disposed at the ends of the main shafts 1b at the side of the outlet port 4, i.e. the outlet port side, and at the main shafts 1b near the rotors 1a. Specifically, all of the bearings 5 for supporting the main shaft 1b are located at the outlet port side, one of the bearings 5 is located at the end of the main shaft 1b near the timing gear 6, and the other of the bearings 5 is located at a position near the rotor 1a. With this arrangement, the rotors 1a of the pump rotors 1 are supported by the bearings 5 in a cantilevered fashion.

The vacuum pump includes a motor M positioned at the outlet port side, and the motor M has a motor rotor 11 directly fixed to one of the main shafts 1b of the pump rotors 1. Timing gears 6 are mounted on the respective ends of the main shafts 1b of the pump rotors 1 for allowing the pump rotors 1 to rotate synchronously in opposite directions when the motor M is energized. Reference numeral 31 represents a gear casing for accommodating the timing gears 6.

Since the motor M is disposed at the side of the outlet port 4 (outlet port side), no bearing for supporting the pump rotor 1 is required at the side of the inlet port 3 (inlet port side), and hence oil molecules from grease or the like used to lubricate bearings do not diffuse into a region located upstream of the inlet port 3.

The motor M will be described in greater detail with reference to FIGS. 3 and 4A through 4D.

Figure 3:
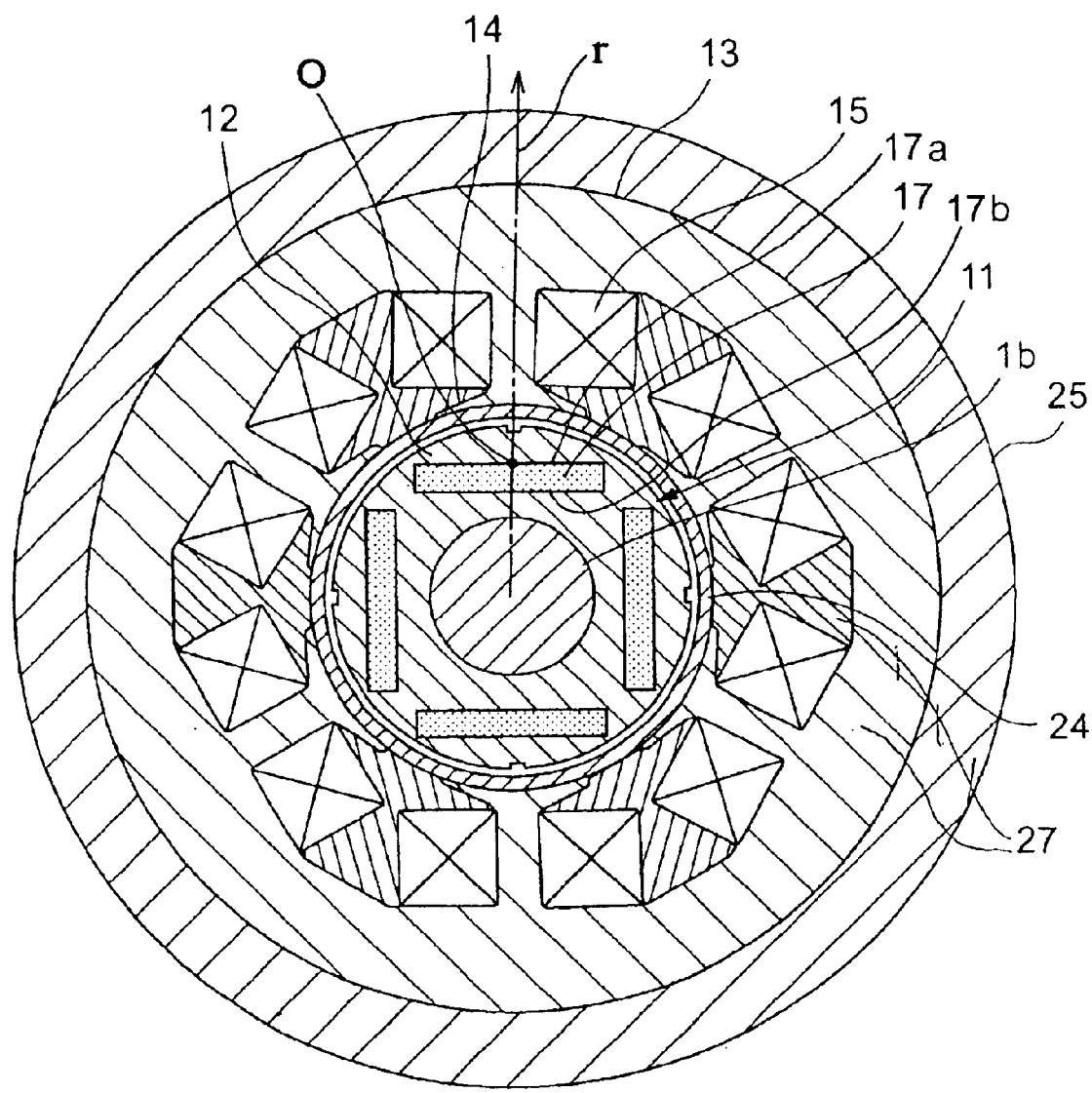
FIG. 3 is a cross-sectional view taken along line III—III of the motor in the positive-displacement screw vacuum pump shown in FIG. 2.

As shown in FIGS. 3 and 4A through 4D, the motor M comprises a permanent-magnet motor having permanent magnets 17 disposed in an iron core 12. As shown in FIG. 3, the motor rotor 11 is directly fixed to the main shaft 1b. The motor M has a stator 13 disposed around the motor rotor 11. The stator 13 has magnetic pole teeth 14 integrally formed with the stator 13 and surrounding the motor rotor 11, and also has coils 15 mounted on the respective magnetic pole teeth 14.

The iron core 12 comprises a laminated assembly of a plurality of thin electromagnetic steel sheets 16. The iron core 12 has four magnet slots 18 where the corresponding permanent magnets 17 are inserted. As shown in FIG. 3, reference numerals 17a and 17b represent the magnetic pole faces of the permanent magnet 17, a chain line arrow r represents the radial direction of the motor rotor 11, and reference sign o represents the center of the magnetic pole face 17a of the permanent magnet 17. The magnet slots 18 are defined at angularly equal intervals around the main shaft 1b such that the magnetic pole faces 17a and 17b of the inserted permanent magnets 17 lie perpendicular to radial directions r of the motor rotor 11. The plate-like permanent magnets 17 are inserted in the respective magnet slots 18 such that the face and back sides of adjacent two of the permanent magnets 17 are alternately of different magnetic poles, and are secured in position by an adhesive (not shown). In the present embodiment, the four permanent magnets 17 are provided in the motor rotor 11, and the magnetic fluxes produced by the permanent magnets 17 inserted in the iron core 12 produce a four-pole flux distribution around the iron core 12 through the electromagnetic steel sheets 16 made of magnetic material. The magnetic fluxes produced by the permanent magnets 17 and a rotating field produced by the stator 13 generate a torque to rotate the motor rotor 11.

Since the motor M has such a structure that the permanent magnets 17 are disposed in the iron core 12, even when the motor rotor 11 is heated to a high temperature which lowers the mechanical strength of the permanent magnets 17 or the bonding strength of the adhesive, the permanent magnets 17 are not detached from the motor rotor 11 and are not scattered around while the motor rotor 11 is in rotation. With the permanent magnet 17 constrained, the vacuum pump can be reliably operated with safety even during high temperature.

The various components composing the motor M will be described in detail below.

Figure 4A:
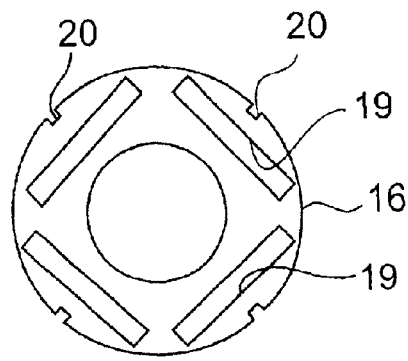
FIG. 4A is a front elevational view of an electromagnetic steel sheet of the motor shown in FIG. 3.

As shown in FIG. 4A, each of the electromagnetic steel sheets 16 has four holes 19 defined therein which are to form the magnet slots 18 of the iron core 12, and also has four recesses 20 defined in an outer circumferential edge thereof. The electromagnetic steel sheet 16 is made of magnetic material, and the holes 19 and the recesses 20 are simultaneously formed by blanking. When the electromagnetic steel sheets 16 are laminated into the iron core 12, the recesses 20 are positioned on extensions in radical directions to the motor rotor 11 from the centers o (shown in FIG. 3) of the magnetic pole faces of the inserted permanent magnets 17.

Figure 4B:
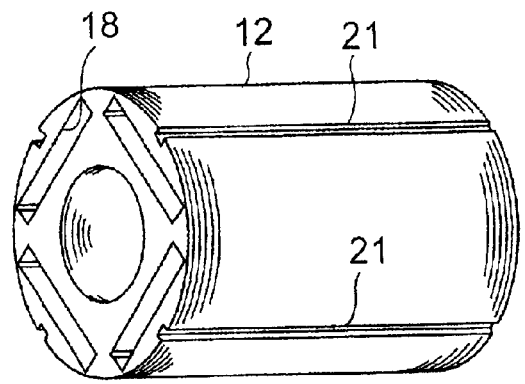
FIG. 4B is a perspective view of an iron core of the motor shown in FIG. 3.
Figure 4C:
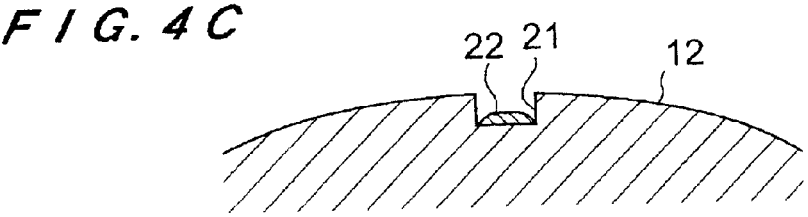
FIG. 4C is an enlarged fragmentary cross-sectional view showing a welded portion of the iron core of the motor shown in FIG. 3.

As shown in FIG. 4B, the recesses 20 defined in the outer circumferential edge of the electromagnetic steel sheets 16 form rectangular welding grooves 21 in the Outer circumferential surface of the iron core 12. The welding grooves 21 are positioned on the extensions in radical directions to the motor rotor 11 from the centers of the magnetic pole faces of the inserted permanent magnets 17, as described above. As shown in FIG. 4C, the laminated electromagnetic steel sheets 16 are welded together to form welded portions 22 in the welding grooves 21.

In the welded portions 22, any variations in the magnetic fluxes during the operation of the motor M are very small. Therefore, any eddy current generated in the iron core 12 is very small, and hence any heat generation in the motor rotor 11 is small. Consequently, it is possible to retain the high efficiency of the motor M. Although the laminated electromagnetic steel sheets 16 are welded together in the present embodiment, the electromagnetic steel sheets 16 may be joined to each other by an applied adhesive. In this case, the electromagnetic steel sheets 16 are laminated and then heated for joining the sheets together. Alternatively, after the electromagnetic steel sheets 16 are laminated, through holes may be formed axially through the iron core, and caulking pins may be inserted into the through holes and then caulked to join the electromagnetic steel sheets 16 together.

Figure 4D:
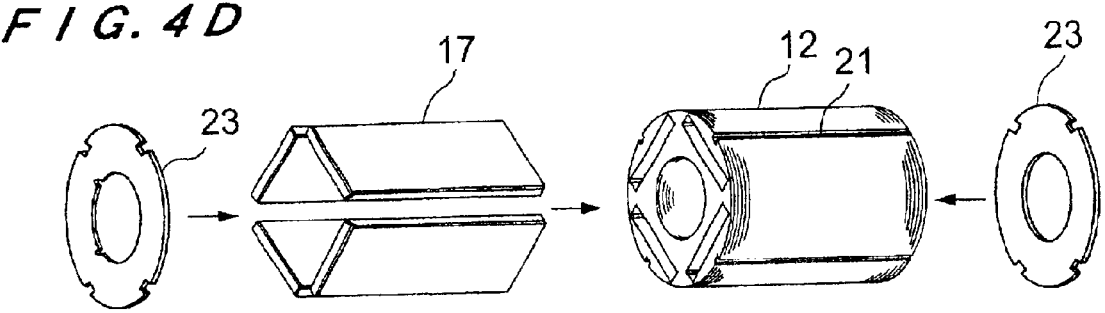
FIG. 4D is an exploded perspective view of a motor rotor of the motor shown in FIG. 3.

As shown in FIG. 4D, non-magnetic stainless-steel side plates 23 having the same recesses as those of the electromagnetic steel sheets 16 are attached to the respective ends of the iron core 12. The side plates 23 are fixed to the ends of the iron core 12 by welding after the permanent magnets 17 are inserted in the iron core 12, and hence the permanent magnets 17 are covered by the side plates 23. Although not shown, the entire outer surface of the motor rotor 11 is coated with an electrodeposited layer of epoxy.

Since the both ends of the iron core 12 with the permanent magnets 17 inserted therein are protected by the side plates 23 and the entire outer surface of the motor rotor 11 is coated with a protective layer, the permanent magnets 17 and other core members are not directly exposed to the gas drawn in by the vacuum pump and hence are prevented from being rusted or corroded. The protective layer may be applied by an ordinary coating process rather than the electrodeposition process. Alternatively, the entire outer surface of the motor rotor 11 may be covered with a plating layer, a thermally shrinkable tube, or a resin layer for thereby enhancing corrosion resistance.

As shown in FIGS. 2 and 3, a can 24 is disposed between the motor rotor 11 and the stator 13 so as to surround the motor rotor 11. The can 24 partitions the inner space within the motor M into a stator chamber and a motor rotor chamber. The can 24 makes it possible to prevent a corrosive gas drawn in by the vacuum pump from entering the motor M, and thus stator members such as coils are prevented from being corroded. The can 24 is made of resin, and hence cannot be heated by eddy currents. A motor frame 25 is disposed around the stator 13 and a helically formed cooling water pipe 26 is embedded in the motor frame 25 in surrounding relation to the stator 13. The motor frame 25 is made of aluminum, and the cooling water pipe 26 comprises a helical pipe of stainless steel whose melting point is higher than the melting point of aluminum. The motor frame 25 and the cooling water pipe 26 are integrally formed by placing the cooling water pipe 26 in a casting material for forming the motor frame 25 when the motor frame 25 is cast. The motor frame 25 is closely fitted over the stator 13 such that the inner circumferential surface of the motor frame 25 is held in close contact with the outer circumferential surface of the stator 13. The cooling water pipe 26 is supplied with cooling water from a cooling water supply device disposed outside of the vacuum pump. Reference numeral 30 represents a motor casing for accommodating the motor M fixed to one of the main shafts 1b, and the other main shaft 1b.

The stator chamber defined between the can 24 and the motor frame 25 is filled with a thermally conductive material 27. The can 24, the stator 13, and the motor frame 25 are integrally joined together by the thermally conductive material 27 to form a unitary structure. The heat generated by the motor rotor 11 is transmitted successively through the can 24, the thermally conductive material 27, and the motor frame 25 in the order named, and then radiated out of the motor frame 25 with motor frame 25 itself is also cooled. The thermally conductive material 27 should preferably be a silicon-based synthetic resin which is highly thermally conductive. The can 24 may be omitted, and the thermally conductive material such as resin may be filled from the inner circumferential surface of the stator 13 to the inner wall of the motor frame 25 to seal the stator components such as the coils, thus isolating the stator and the motor rotor from each other.

When the positive-displacement screw pump is operated, since the gas drawn in from the inlet port 3 is compressed and delivered to the outlet port 4 by the rotors 1a which are synchronously rotated in opposite directions, a portion around the outlet port 4 is heated to a high temperature. In the present embodiment, since the motor M has the permanent magnets 17 disposed within the iron core 12, the motor M can be located at a side of the outlet port 4 (outlet port side) which is not heated to a high temperature. It is not necessary to provide any bearing at the side of the inlet port 3 (inlet port side).

In the motor rotor 11 constructed as described above, an extremely small quantity of heat is generated. Even when the motor rotor 11 is suddenly heated to a high temperature since the motor frame 25 has a water cooling device or structure, the motor rotor 11 is prevented from being excessively heated, and thus it is possible to make the motor M highly safe in operation. In the present embodiment, cooling water is circulated through the cooling water pipe 26 in the motor frame 25. Alternatively, a cooling gas may be circulated through the cooling water pipe 26. Although an example in which the present invention is applied to the screw vacuum pump has been described in the first embodiment, the principles of the present invention are also applicable to a twin-shaft vacuum pump such as a Roots vacuum pump, a claw vacuum pump or the like.

A positive-displacement multistage Roots vacuum pump according to a second embodiment of the present invention will be described below with reference to FIGS. 5 and 6.

Figure 5:
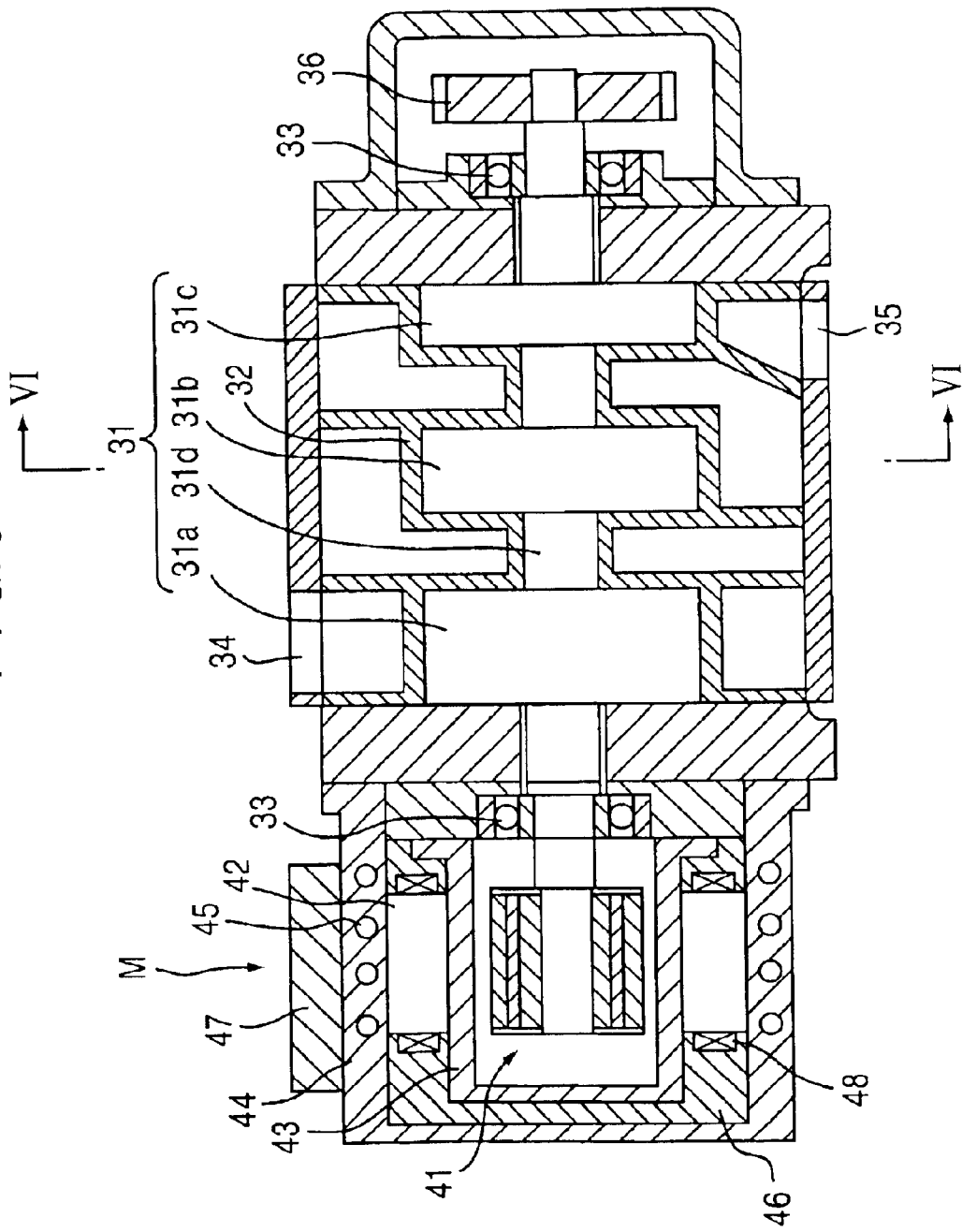
FIG. 5 is a cross-sectional view of a Roots-type positive-displacement multistage vacuum pump according to a second embodiment of the present invention.

As shown in FIG. 5, the positive-displacement multistage Roots vacuum pump according to the second embodiment has a pair of confronting pump rotors 31 each comprising rotors 31a, 31b and 31c and a main shaft 31d. The rotors 31a, 31b and 31c having different axial widths from each other are spaced at substantially equal intervals and mounted on the main shafts 31d. The pair of the confronting pump rotors 31 are supported by bearings 33, respectively, and their rotors 31a, 31b and 31c are housed in a casing 32. The vacuum pump has an inlet port 34 disposed above the rotor 31a which has the largest width, and also has an outlet port 35 disposed below the rotor 31c which has the smallest width.

Figure 6:
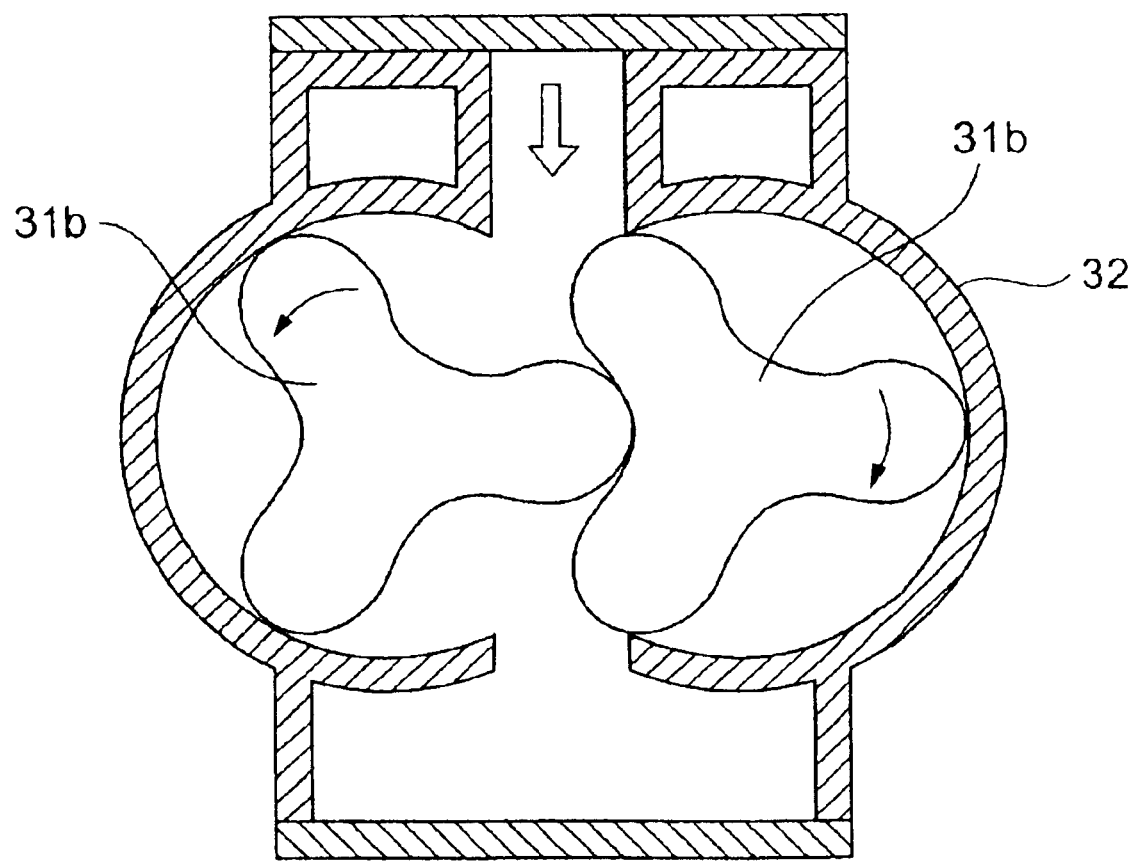
FIG. 6 is a cross-sectional view taken along line VI—VI of FIG. 5.

In FIG. 6, a small clearance is formed between the confronting rotors 31b and between the rotors 31b and the casing 32 to allow the rotors 31b to be rotated in a noncontact manner. The pair of the confronting rotors 31b are synchronously rotated in opposite directions. A gas, hollow arrow, is confined in the space between the rotors 31b and the casing 32 and the gas is delivered to the outlet port 35. In this manner, the gas is continuously delivered and thus evacuated from a vacuum chamber which is provided at the upstream side of the inlet port 34 and communicates with the inlet port 34. The rotors 31a and the rotors 31c are constructed similarly to the rotors 31b shown in FIG. 6.

As shown in FIG. 5, a motor M has a motor rotor 41 mounted on one of a main shafts 31d at the end of the main shaft 31d located at the side of the inlet port 34 (inlet port side), and timing gears 36 are fixed to the other ends of the main shafts 31d. The timing gears 36 serve to rotate the pump rotors 31 synchronously in opposite directions. The pump rotors 31 are rotatably supported by bearings 33 located at one ends of the pump rotors 31 near the outlet port 35 and at the other ends of the pump rotors 31 near the rotors 31a in the vicinity of the inlet port 34. The motor rotor 41 attached to the main shaft 31d is supported by the bearing 33 in a cantilevered fashion.

In the second embodiment, the motor M is not positioned at the side of the outlet port 35 (outlet port side) which is heated to a high temperature, but is located at the side of the inlet port 34 (inlet port side) which is kept at a relatively low temperature. In addition, the motor rotor 41 is of the same structure as the motor rotor according to the first embodiment, and any heat generation thereof is very small. Therefore, the vacuum pump according to the second embodiment is thermally stable, and is operated at a high efficiency.

As shown in FIGS. 5 and 6, a can 43 is disposed between the motor rotor 41 and a stator 42 in surrounding relation to an inner circumferential surface of the stator 42. The motor M is disposed at the side of the inlet port 34 where a vacuum is developed. The can 43 prevents a gas generated in the stator 42 from flowing into the inlet port 34, thus keeping a good vacuum condition. The can 43 also prevents an introduced corrosive gas from reacting with components of coils 48 of the stator 42.

The motor M includes a motor frame 44 having a helical water cooling pipe 45 embedded therein. A motor driver 47 for energizing the motor M is held in close contact with and fixed to an outer surface of the motor frame 44. The heat generated by the motor rotor 41 is transmitted successively through the can 43, a thermally conductive material 46, and the motor frame 44 in the order named, and then radiated out of the motor frame 44. Therefore, a cooling effect of the motor rotor 41 can be further improved. Since the motor rotor 41 is supported in a cantilevered fashion, the can 43 has a large radiant heat receiving surface area which increases cooling capability. The motor driver 47 which generates heat during operation of the vacuum pump is also cooled via the motor frame 44.

The thermally conductive material 46 such as a resin material is filled in the stator chamber of the motor M, and thus the can 43 serving as a vacuum container is reinforced by the thermally conductive material 46. Therefore, even if the can 43 is damaged for some reasons, the vacuum can be maintained in the motor rotor chamber of the motor M. The thermally conductive material 46 also functions as a material for attenuating noise transmitted from the interior of the vacuum pump, and is thus capable of reducing such noise.

Although an example in which the present invention is applied to the Roots vacuum pump has been described in the second embodiment, the principles of the second embodiment are also applicable to a twin-shaft vacuum pump such as a screw vacuum pump, a claw vacuum pump or the like.

Although certain preferred embodiments of the present invention have been shown and described in detail, it should be understood that various changes and modifications may be made therein without departing from the scope of the appended claims.

As described above, according to the present invention, the following advantages can be obtained:

(1) Since the permanent magnets are embedded in the iron core, even if the mechanical strength is lowered or the bonding strength of an adhesive by which the permanent magnet is secured in position is lowered by a high temperature, the permanent magnet is prevented from being expanded, or from being detached from the motor rotor and scattered. Therefore, the vacuum pump can be operated in a highly reliable fashion.

(2) Since the permanent magnets are protected by an iron core, the permanent magnets are prevented from being damaged while the vacuum pump is being assembled. Thus, the permanent magnets are prevented from being broken during operation. Further, when the permanent magnets happen to be damaged while the vacuum pump is in operation, the permanent magnets are prevented from being scattered out of the motor rotor. The motor can thus operate continuously well, thereby allowing the vacuum pump to operate in a highly reliable fashion.

(3) Even when a corrosive gas used in a semiconductor fabrication process is evacuated by the vacuum pump, the permanent magnets of the motor rotor are prevented from contacting the corrosive gas. Therefore, the permanent magnets are prevented from being corroded, from a reduction in their magnetic fluxes and from being damaged.

(4) With the motor being disposed at the side of the outlet port (outlet port side), since the pump rotors are supported in a cantilevered fashion, it is not necessary to dispose a bearing at the inlet port side. Therefore, an oil mist from grease or the like used to lubricate such a bearing does not diffuse into a region located upstream of the inlet port. Especially, it is not required to use a complex shaft seal mechanism in the vacuum pump for preventing an oil mist from diffusion. The vacuum pump is therefore made simple and compact.

What is claimed is:

1. A vacuum pump comprising:

a casing having an inlet port and an outlet port;

a pair of confronting pump rotors provided inside said casing and being synchronously rotatable for drawing in a gas from said inlet port and discharging the gas from said outlet port, said pair of confronting pump rotors each having a rotor and a main shaft supporting said rotor; and a motor for rotating said confronting pump rotors, said motor comprising a permanent magnet motor having a stator and a motor rotor fixed to said main shaft of one of said pair of confronting pump rotors, said motor rotor having an iron core comprising a laminated assembly of electromagnetic steel sheets and a plurality of permanent magnets disposed within said iron core around a shaft of said motor rotor such that respective magnetic pole faces of said permanent magnets lie substantially perpendicular to radial directions of said motor rotor.

2. A vacuum pump according to claim 1, wherein said motor rotor further comprises side plates fixed to two axial ends of said iron core so as to cover said permanent magnets within said iron core.

3. A vacuum pump according to claim 1, wherein said laminated assembly of electromagnetic steel sheets is welded on an outer circumferential surface of said iron core at positions located in said radial directions from centers of magnetic pole faces of said permanent magnets.

4. A vacuum pump according to claim 3, wherein said electromagnetic steel sheets have respective recesses defined in outer circumferential edges at the positions located in said radial directions from magnetic pole centers of said permanent magnets.

5. A vacuum pump according to claim 1, wherein said motor rotor has an outer circumferential surface covered with a protective layer.

6. A vacuum pump according to claim 1, wherein said permanent magnet motor is disposed at a side of said outlet port.

7. A vacuum pump according to claim 6, wherein said pump rotors comprise respective main shafts rotatably supported by bearings, said bearings for supporting each of said main shafts are positioned at a predetermined position in a region at an end of the main shafts at said side of said outlet port to a rotor of said pump rotors such that said rotor is supported in a cantilevered fashion by one of said bearings.

* * * * *